United States Patent Office 2,741,654
Patented Apr. 10, 1956

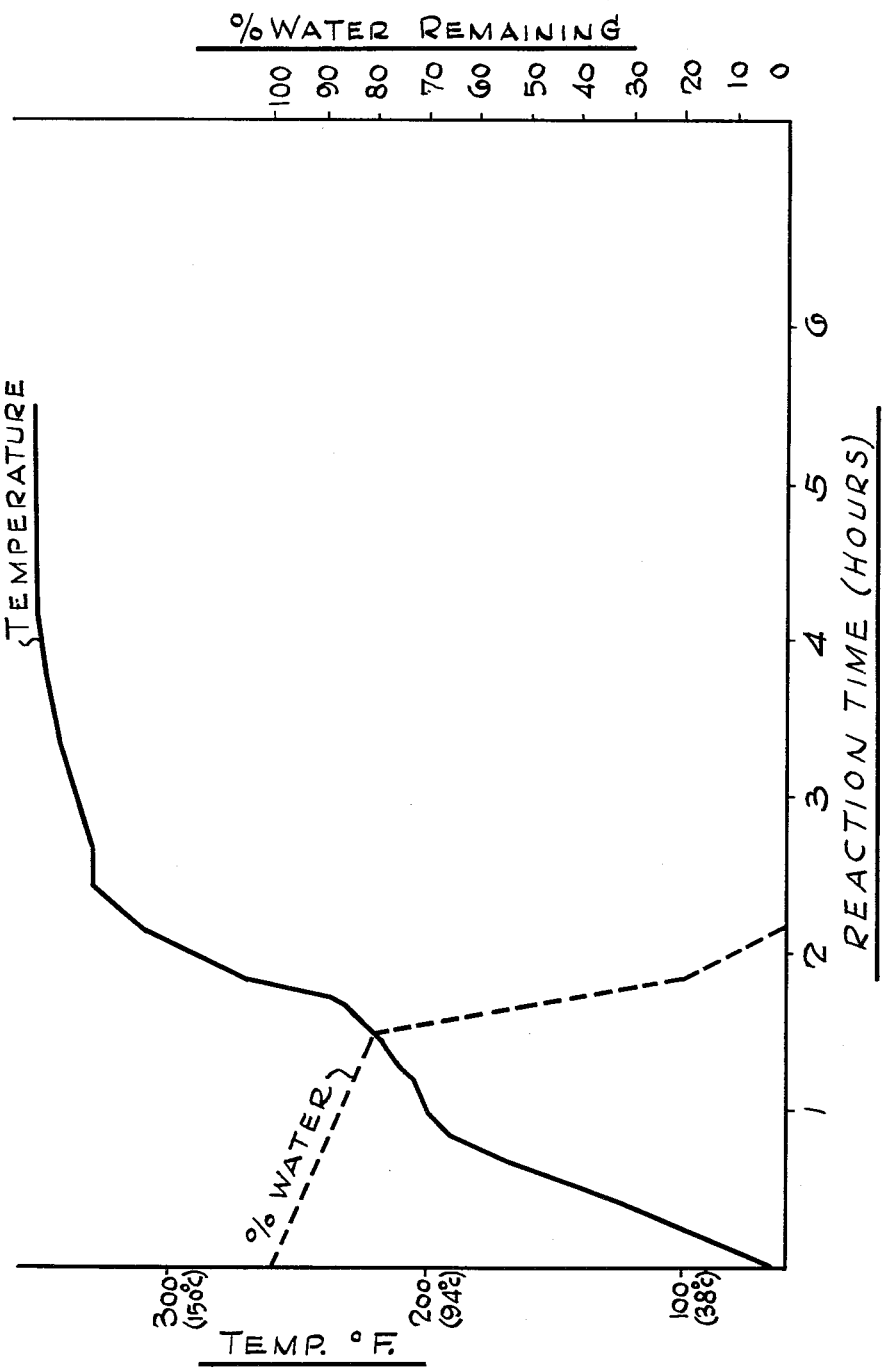

2,741,654
CHEMICAL PROCESS

Edward Barrie Vernon Potter, Drayton, England, assignor to Esso Research and Engineering Company, a corporation of Delaware Application August 7, 1952, Serial No. 303,075

Claims priority, application Great Britain September 21, 1951

2 Claims. (Cl. 260—139)

The present invention relates to an improved chemical process and relates more particularly to an improved process of the type in which organic materials in liquid phase are reacted with elemental sulphur to form sulphurised materials, with or without a catalyst for the sulphurisation reaction. The products of such reactions are sulphur-containing bodies having a relatively high sulphur content, and the reactions themselves are generally highly exothermic and accompanied by copious evolution of hydrogen sulphide.

Examples of such reactions are the sulphurisation of fatty oils such as sperm oil or lard oil, of unsaturated esters such as glyceryl oleates, glycol esters of tall oil or rapeseed oil acids, of unsaturated acids such as oleic or ricinoleic acid. Other typical starting materials are liquid olefins such as those recovered from cracked paraffin wax, and other hydrocarbons containing ethylenic unsaturation such as mono- and di-cyclic terpenes, including crude mixtures in which they occur such as pine oil or turpentine.

The majority of such sulphurised products have found use as additives for mineral lubricating oils mostly as extreme pressure agents. The terpenes are particularly attractive as additives owing to their cheapness and ease of sulphurisation and are the preferred starting materials for the process of the present invention. The ease of sulphurisation carries with it the drawback, however, that temperature control of the reaction is rendered proportionately more difficult. Thus, in order to maintain the reaction mixture of sulphur and terpene at a suitable reaction temperature, large amounts of heat have to be withdrawn from the system and the rate at which this heat can be withdrawn is effectively a limit on the capacity of the reaction system. Known methods for the removal of heat from such systems include internal or external cooling coils which are not very flexible in operation, and reflux condensers in which the heat of reaction is removed as the heat of evaporation of the more volatile reactant or of a volatile diluent used in the reaction. It will be readily understood that the problem of temperature control in exothermic reactions of this type become more difficult and more important as the scale of operation increases. Thus a reaction which is readily controllable in a glass flask and reflux condenser in the laboratory may prove less amenable in a pilot plant reactor of say 25 to 50 gallon capacity and still less controllable in a full manufacturing scale reactor of say 1,000 to 2,000 gallons capacity.

According to the present invention, in an exothermic reaction of the type in which water-inert organic materials are sulphurised with elemental sulphur, temperature control is achieved by the provision of free liquid water in controlled amounts in the reacting mixture.

The water being immiscible with the reactants and inert to the reaction does not impede it in any way, and, being added in controlled amounts, has all boiled off by the end of the reaction and therefore does not contaminate the product. It also has the advantage of an exceptionally high heat of vaporisation of the order of over 500 gm. cals./gm. as compared, for example, with a figure of 68 for turpentine. For this reason the volume of liquid evaporated for a given heat removal is much smaller than when the reactant hydrocarbon alone or other organic diluent is used, and this results in economy in the refluxing equipment. The recovered vapours consisting of both steam and hydrocarbon vapours may be condensed and the hydrocarbon phase recycled with or without the water. A further advantage of the process is that it provides a primary recovery stage for the hydrogen sulphide evolved in the reaction as a part of this will go into solution in the condensed water.

As already stated, the invention is particularly applicable to the sulphurisation of unsaturated hydrocarbons, especially terpenes, and of these monocyclic terpenes represented by dipentene (dl-limonene) are preferred.

Commercial dipentene is a liquid of varying composition generally containing from 65 to 30% of dipentene with from 5 to 60% of terpinolene the remainder consisting predominantly of p-cymene and p-menthane.

The sulphurisation reaction is normally carried out at a temperature from 135° to 200° C. and in an amount ranging from 1.5 to 2 atoms of sulphur per mole of terpene. Catalysts may be used notably the so-called rubber "vulcanisation accelerators" examples of which are mercapto benzo thiazole and tetramethyl thiuram disulphide. The actual reaction is complex, and, among other things, involves the conversion of a part of the limonene to p-cymene. The desired reaction product is a reddish-brown oil containing about 20–30% by weight of sulphus. Additional data on this process will be found in copending application No. 15,302/50 which deals primarily with the working up of the sulphurised product by steam distillation. Preferred conditions recited in this copending case are the use of 20–35%, preferably 25–30% of sulfur in the reaction mixture, the remainder being dipentene; a reaction temperature in the range of 135 to 200° C., preferably 170–180° C. and the continuous or batchwise introduction of sulphur into the reaction mixture so as to exercise better control over the reaction. Catalysts of the type mentioned are used in amounts of 1 to 2% based on the reaction mixture. The reaction proceeds as a first highly exothermic stage in which the temperature rises sharply from about 110° C. to about 170° C. (the boiling point of crude dipentene) and thereafter is maintained in a reasonably controlled state at that temperature.

In the process as described no provision is made for the removal of the heat of reaction other than the conventional refluxing of the reactants, and this does not start until the initial and most dangerous exothermic stage is in full swing. Accordingly it will serve well to illustrate the process of the present invention in which liquid water is used as a direct coolant in the reaction mixture.

It will be obvious that a prerequisite of the process is that the reaction temperature or the runaway temperature to be avoided should be above the boiling point of water. In the present case with a reaction temperature of about 150° C. at atmospheric pressure, this requirement is well met.

In the simplest embodiment of the invention, namely a batch process in which all the sulphur and terpene, preferably dipentene, are heated together in a vessel having a reflux condenser, the calculated amount of water may be added to provide adequate removal of the heat of reaction at the estimated rate of evolution. Then assuming adequate efficiency of the condenser system to deal with any temporary overloading due to reaction runaways, the weight of water evaporated off will be about seven times smaller than the corresponding weight of dipentene which would have been needed for the same effect, even if the dipentene were being refluxed during the early stages of the reaction, which is not the case. The amount of vapour rapidly evolved will thus be smaller and less liable to cause violent motion of the liquid reactants, and will also be less liable to exceed the vapour capacity of the condenser. Alternatively a condenser with a smaller vapour capacity may be used.

In alternative embodiments, the sulphur may be added in batches or continuously and the water may be present in the initial mixture or added at any suitable stage and then continuously refluxed back into the reactor. Alternatively water may be added with the sulphur in controlled amounts and withdrawn from the system as it evaporates, e. g., by condensing the vapours and recycling only the hydrocarbon phase. In this embodiment it may be advantageous to feed the sulphur in as a slurry or colloidal suspension in the water.

A particularly advantageous form of the invention in which temperature control is facilitated is to inject the water directly into the reaction mixture in a finely divided or atomised form as and when it is needed. Water injection into the base of the reactor will also facilitate the stirring up of any sulphur which may have settled out as sludge on the bottom. This method is particularly well adapted to automatic control, e. g., by means of electrically controlled valves of known type. Thermocouples or other suitable temperature indicators may be provided in the reactor, together with a suitable relay circuit set so as to open the water valve and inject water whenever the reaction temperature exceeds a predetermined maximum, the valve being automatically closed and the flow of water stopped when the temperature has fallen to the desired level. In this embodiment it is obviously preferable that the water should be removed from the system as it evaporates so as to prevent any accumulation in the reactor.

The general principles set out above, while described with specific reference to the sulphurisation of relatively volatile terpenes, are equally applicable, mutatis mutandis, to the sulphurisation of other organic materials as already mentioned. Materials such as fatty oils which are substantially non-volatile at sulphurisation temperatures will obviously not reflux, and when using the process of the present invention no phase separation of the overhead is needed unless a volatile diluent is also used. Obvious prerequisites for the successful operation of the invention are that the reactants and the reaction product should be inert to water. Their water-solubility is irrelevant, although as a matter of fact they will be predominantly water insoluble.

To illustrate the effectiveness of even the simplest embodiment of the invention, one experimental run of the sulphurisation of commercial dipentene is described below.

Into a distillation flask provided with a stirrer and a Dean and Stark apparatus attached to its side arm, there were charged 612 grams of dipentene, 244 grams of sulphur, 30 grams water, 8.6 grams mercaptobenzothiazole and 4.3 grams diphenyl guanidine. The flask was heated over a period of six hours by which time the reaction was complete. The variation of temperature with time is shown on the accompanying graph which also shows the percentage of the water remaining at any given time.

Two things are immediately apparent from the graph. One is that the presence of the water enables the temperature to rise smoothly up to about 330° F., by which time the reaction is under control and the reaction mixture may safely be heat-soaked for a further four hours or so. The second is that due to the fine state of subdivision of the water in the reaction mixture, which in turn is partly due to its boiling and partly to efficient stirring, ample water remains to serve as coolant over the temperature range 212° F. to 300° F. corresponding to a time interval of about half an hour. This half hour is the danger period of the reaction. Thus by reference to the graph it will be seen that over 80% of the water is present at a temperature of 212° F., that 50% is still present at about 240° F. and that 10% is still present at 300° F. The whole of the water had disappeared at 330° F., by which time its function was over. The finished product was in every way equivalent to that prepared in the absence of water, both as regards its physical and chemical characteristics, and as regards its performance as a lubricating oil additive.

In summary, therefore, the present invention produces an improved method for carrying out exothermic sulphurisation reactions using elemental sulphur in which liquid water is used as a direct heat-removal agent. To achieve most satisfactory results it is desirable that the water should be finely divided and dispersed throughout the reaction mass, as in this way effective cooling is obtained at temperatures well above 212° F. (100° C.) and the dangers of bumping and the like are largely alleviated.

What I claim is:

1. In the process of sulfurizing terpene hydrocarbons by an exothermic reaction with elemental sulphur carried out at temperatures above the boiling temperature of water at the reaction conditions the step of controlling the reaction temperature, which comprises adding to the reaction mixture free liquid water in amounts controlled to maintain said temperature by cooling resulting from evaporation of said water in said mixture.

2. The process according to claim 1 wherein the water is injected into the reaction mixture in finely divided form.

References Cited in the file of this patent
UNITED STATES PATENTS

| | | |
|---|---|---|
| 1,926,687 | Palmer et al. | Sept. 12, 1933 |
| 2,012,446 | Edwards et al | Aug. 27, 1935 |
| 2,337,473 | Knowles | Dec. 21, 1943 |
| 2,338,829 | Werntz | Jan. 11, 1944 |
| 2,402,456 | Signaigo | June 18, 1946 |
| 2,409,376 | Mekler | Oct. 15, 1946 |